United States Patent
Bowling

[11] Patent Number: 5,137,539
[45] Date of Patent: Aug. 11, 1992

[54] METHOD FOR PRODUCING DRIED PARTICULATE COAL FUEL AND ELECTRICITY FROM A LOW RANK PARTICULATE COAL

[75] Inventor: Chester M. Bowling, Evergreen, Colo.

[73] Assignee: Atlantic Richfield Company, Los Angeles, Calif.

[21] Appl. No.: 541,560

[22] Filed: Jun. 21, 1990

[51] Int. Cl.$^5$ ............................................ C10L 5/00
[52] U.S. Cl. ........................................ 44/626; 44/501; 44/505; 34/22
[58] Field of Search .............. 44/505, 626, 501; 34/34, 22

[56] References Cited

U.S. PATENT DOCUMENTS

| | | | |
|---|---|---|---|
| 4,059,060 | 11/1977 | Gambs et al. | 44/626 |
| 4,332,593 | 6/1982 | Burgess et al. | 44/626 |
| 4,395,334 | 7/1983 | Nakabayashi et al. | 44/626 |
| 4,396,394 | 8/1983 | Li et al. | 44/501 |
| 4,396,395 | 8/1983 | Skinner et al. | 44/501 |
| 4,401,436 | 8/1983 | Bonnecaze | 44/501 |
| 4,402,706 | 9/1983 | Wunderlich | 44/501 |
| 4,402,707 | 9/1983 | Wunderlich | 44/501 |
| 4,421,520 | 12/1983 | Matthews | 44/501 |
| 4,486,959 | 12/1980 | Chang | 44/626 |
| 4,495,710 | 1/1985 | Ottoson | 34/10 |
| 4,498,905 | 5/1985 | Skinner | 44/602 |
| 4,501,551 | 2/1985 | Riess et al. | 44/501 |
| 4,527,342 | 7/1985 | Li | 34/10 |
| 4,545,132 | 10/1985 | Li et al. | 34/10 |
| 4,571,174 | 2/1986 | Shelton | 432/14 |
| 4,725,337 | 2/1988 | Greene | 34/36 |
| 4,761,162 | 8/1988 | Ratliffe et al. | 44/608 |

OTHER PUBLICATIONS

Shreve's Chemical Process Industries 5th Edition McGraw-Hill Book Co. New York 1984 pp. 55-59 and 70-73.

Design Considerations for Large Utility Steam Generators, Combustion Engineering Inc., Presentation Feb. 3-5, 1975.

Primary Examiner—Prince Willis, Jr.
Assistant Examiner—James M. Silbermann
Attorney, Agent, or Firm—F. Lindsey Scott

[57] ABSTRACT

A method for producing dried particulate coal fuel and electricity from a low rank particulate coal in a combined process.

14 Claims, 1 Drawing Sheet

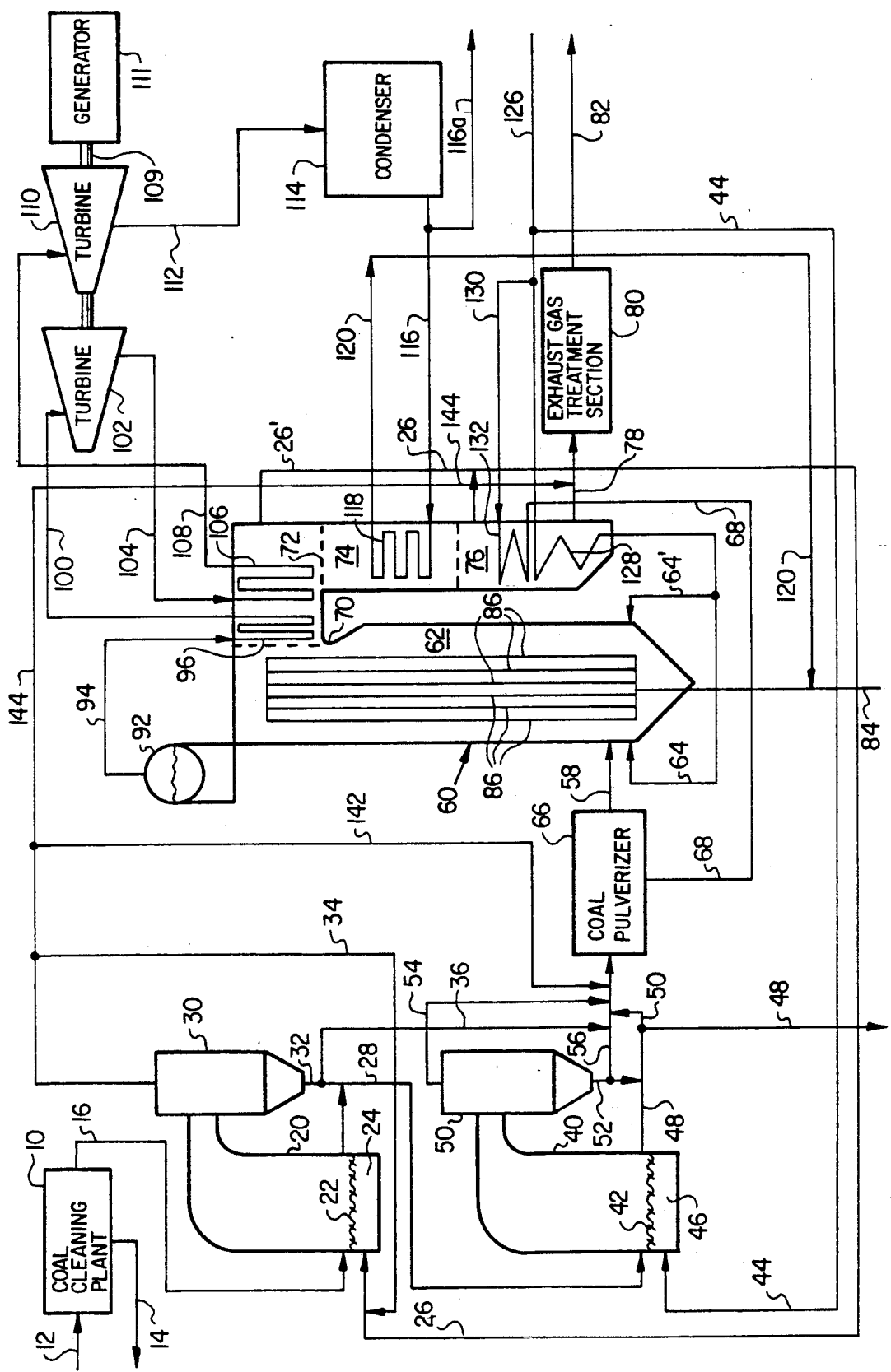

METHOD FOR PRODUCING DRIED PARTICULATE COAL FUEL AND ELECTRICITY FROM A LOW RANK PARTICULATE COAL

BACKGROUND OF THE INVENTION

1. Field of the Invention

This invention relates to a method for producing dried particulate coal fuel and electricity from a low rank particulate fuel by drying the particulate low rank coal in a coal drying zone using a heated combustion gas from a coal combustion zone associated with the production of electricity to dry the low rank particulate coal in the coal drying zone and to pre-heat the boiler combustion air by first using the air to cool the dried coal.

2. Background

In many instances, coal as mined contains undesirably high quantities of water for transportation and use as a fuel. This problem is common to all coals, although in higher rank coals such as anthracite and bituminous coals the problem is less severe because the water content of the coal is normally lower and the heating value of such coals is higher.

The situation is different with respect to lower rank coals such as sub-bituminous, lignite and brown coals. Such coals as produced typically contain from about 15 to about 65 weight percent water. While many such coals are desirable as fuels because of their relatively low mining cost and since many such coals have a relatively low sulphur content, the use of such lower rank coals as fuel has been greatly inhibited by the fact that as produced they typically contain a relatively high percent of water. Attempts to dry such coals for use as a fuel have been inhibited by the tendency of such coals, after drying, to undergo spontaneous ignition and combustion in storage, transit or the like. The drying required with such low rank coal is a deep drying process for the removal of surface water plus the large quantities of inherent (interstitial) water present in such low rank coals. By contrast, when higher grade coals are dried, the drying is commonly for the purpose of drying the surface water from the coal particle surfaces but not inherent water since the inherent water content of the higher rank coals is relatively low. As a result, short residence times in the drying zone are normally used and the interior portions of the coal particles are not heated since such is not necessary for surface drying. Typically the coal leaving the dryer in such surface water drying processes is at a temperature below about 110° F. (45° C.).

By contrast, processes for the removal of inherent water require longer residence times and result in heating interior portions of the coal particle. The coal leaving a drying process for the removal of inherent water will typically be at a temperature of about 130° to about 250° F. (54° to 121° C.). When such processes for the removal of inherent water are applied to low rank coals, the resulting dried coal has a strong tendency to spontaneously ignite, especially at the high discharge temperatures, upon storage, during transportation and the like.

The tendency to spontaneously ignite can be reduced by cooling the dried low rank coal to a temperature below 100° F. (38° C.) and preferably below about 80° F. (27° C.) promptly after the drying process. The tendency to spontaneously ignite can be further reduced by use of deactivating fluids. Various processes for the drying, coating and deactivation of low rank coals are shown in U.S. Pat. Nos. 4,396,394; 4,396,395; 4,401,436; 4,402,706; 4,402,707; 4,421,520; 4,495,710; 4,498,905; 4,501,551; 4,527,342; 4,545,132 and 4,571,174. These patents are hereby incorporated in their entirety by reference.

While drying low rank coals as disclosed in these patents results in the production of a dried low rank coal having a reduced tendency to spontaneously ignite, such processes require the generation of a heated drying gas at a mine site or other remote location. The drying of the low rank particulate coal is best accomplished at a mine site or near a mine site to obtain the advantages of reduced transportation costs resulting from the reduction in the weight of the low rank coal fuel. Combustion processes of the types required to generate the drying gas are not normally conducted in such areas and when conducted require the installation of combustion equipment and scrubbing equipment for clean-up treatment of the exhaust gases to remove sulfur oxides, particulates and the like.

Such processes also require a fan system for controlled flow of inlet air and a fan for controlled flow of exhaust gases.

Further, the use of such coal drying processes results in the production of a large portion of the dried coal fuel as fines, i.e. coal particles of a size consist smaller than about 80 Tyler Mesh. While such finely divided coal is highly desirable for use as a fuel it is difficult to transport and frequently constitutes a waste at the coal drying site. As a result while such coal drying processes result in the production of a dried low rank coal fuel having an increased BTU content which can be transported more economically, the processes require the installation of combustion equipment, fan equipment and exhaust gas clean-up equipment at remote sites and result in the loss of a portion of the low rank coal charged to the drying process to waste.

Electric generating facilities are frequently coal fired. The use of coal fired furnaces of a variety of types such as tangentially fired dry bottom furnaces, fluidized bed furnaces and the like for the generation of electricity is well known and such furnaces require that the coal fed to the furnace be finely divided. The finely divided coal is combusted to produce a hot combustion gas which is passed through a series of heat exchange zones to produce heated and superheated steam for use in driving turbines to produce electricity. While the use of finely divided coal is required in such coal fired furnaces the difficulty in transporting the finely divided coal prohibits transportation of the finely divided coal produced in the drying process for long distances for this purpose since excessive amounts of the finely divided coal are lost during transportation and constitute not only a lost product but an undesirable pollutant. Accordingly larger particles of dried low rank coal are transported for grinding to finely divided particles prior to charging the dried low rank coal to the furnace. Generally coal fired furnaces require the use of exhaust gas clean-up treatment facilities to remove sulfur oxides and particulates from the exhaust gas prior to discharging the exhaust gas to the atmosphere.

According to the present invention a synergistic improvement in the use of low rank coal for use as a fuel to generate electricity is accomplished by producing dried particulate low rank coal fuel and electricity from a low rank particulate coal by a method consisting essentially of:

(a) charging particulate low rank coal to a coal drying zone wherein the coal is supported on a first support means, the first support means being adapted to the flow of a hot gas upwardly through the support means and the particulate low rank coal;

(b) drying the particulate low rank coal in the coal drying zone by flowing a hot gas upwardly through the first support means and the particulate low rank coal to produce the dried particulate coal fuel;

(c) charging a portion of such dried particulate coal to a coal burning unit for combustion to produce a hot combustion gas stream;

(d) charging a portion of the hot combustion gas to a heat exchange zone to produce steam;

(e) charging at least a portion of the steam to an electrical generator to produce electricity; and (f) charging a portion of the hot combustion gas to the coal drying zone as hot gas.

The FIGURE is a schematic diagram of a process embodying the present invention. In the description of the FIGURE, the same numbers will be used to refer to the same or similar components throughout.

Further it should be noted that in the description of the FIGURE reference will be made to lines generally rather than attempting to distinguish between lines as conduits, conveyors or the like as required for the handling of the particular streams.

In the FIGURE, a run of mine coal stream is charged through a line 12 to a coal cleaning or preparation plant 10 from which a coal stream is recovered through a line 16 with a waste stream comprising gangues and the like being recovered and passed to discharge through a line 14. In some instances it may not be necessary to pass the run of mine coal to a coal cleaning or processing plant prior to charging it to the process of the present invention. The coal stream recovered from preparation plant 10 through line 16 is passed to a crusher (not shown) where it is crushed to a suitable size and passed to a coal dryer 20. While a size consist of less than about two inches, i.e. two inches by zero may be suitable in certain instances, typically a size consist of about one inch by zero or about three-quarters inch by zero will be found more suitable. In dryer 20 the coal moves across dryer 20 above a grate 22 at a rate determined by the desired residence time in dryer 20. A hot gas is passed upwardly through the coal moving across grate 22 to dry the coal. The hot gas is supplied via a line 26 at a temperature suitable for drying the coal. As will be obvious to those skilled in the art the temperature can be varied by diluting the hot gas with an oxygen deficient gas such as a recycled gas from the dryer exhaust supplied through a line 34.

In the FIGURE, a distribution chamber 24 is provided beneath grate 22 to provide a uniform upward flow of the hot gas through grate 22. The exhaust gas from dryer 20 is passed through a cyclone 30 where finely divided particles generally larger than about 80 Tyler Mesh are separated from the exhaust gas via a line 32. The exhaust gas which may still contain finely-divided solids smaller than about 100 Tyler Mesh is passed through a line 144 to further processing. The dried coal product from dryer 20 is recovered via a line 28, combined with the finely divided solids recovered from cyclone 30 through line 32 and passed to a cooler 40. The dried coal moves across cooler 40 above a grate 42. A cool gas, which may be and preferably is, air is introduced through a line 44 into a distribution chamber 46 beneath grate 42 and passed upwardly through the dried coal to cool the dried coal. The exhaust gas from cooler 40 is passed to a cyclone 50 where solids generally larger than about 80 Tyler Mesh are recovered through a line 52 with the exhaust gas being passed through a line 54 to further processing. The cooled dried coal product is recovered through a line 48 and may be combined with the solids recovered through a line 52. The cooled dried coal product is recovered through a line 48 and may be combined with the solids recovered from cyclone 50 to produce a dried coal product. The tendency of such dried low rank coals to spontaneously ignite is inhibited greatly by cooling such coals after drying. In some instances no further treatment may be necessary to produce a dried coal product which does not have an undue tendency to spontaneously ignite upon transportation and storage. In other instances it will be necessary to treat the dried coal product further. In such instances, the dried coal product may be coated with a suitable deactivating fluid in a mixing zone (not shown). The deactivating fluid is intimately mixed with the cool dried coal to produce a coal product which has a reduced tendency to spontaneously ignite under normal storage and transportation conditions. The dried coal is preferably mixed with the deactivating fluid at a temperature no higher than about 200° F. (94° C).

In the operation of dryer 20 the discharge temperature of the dried coal is typically about 130° to about 250° F. (54° C. to 121°) and is preferably about 190° to 220° F. (88° to 104° C.). The hot gas is passed upwardly through the coal on grate 22 at a suitable rate to maintain the coal in a fluidized or semi-fluidized condition above grate 22. The residence time is chosen to accomplish the desired amount of drying and is readily determined experimentally by those skilled in the art based on the particular type of coal, the gas temperature and the like. For instance, when drying sub-bituminous coal an initial water content of about 30 weight percent is common. Desirably such coals are dried to a water content of less than about 15 weight percent and preferably from about 5 to about 10 weight percent. Lignite coals often contain in the vicinity of about 40 weight percent water and are desirably dried to less than about 20 weight percent water with a range from about 5 to about 20 weight percent water being preferred. Brown coals may contain as much as or in some instances even more than about 65 weight percent water. In many instances it may be necessary to treat such brown coals by other physical separation processes to remove portions of the water before drying is attempted. In any event these coals are desirably dried to a water content of less than about 30 weight percent and preferably to about 5 to about 20 weight percent. The residence times for such coals in dryer 20 may be determined experimentally by those skilled in the art for each particular coal. The determination of a suitable residence time is dependent on many variables and will not be discussed in detail.

The water contents referred to herein are determined by ASTMD 3173 entitled "Standard Test Methods for Moisture in the Analysis Sample of Coal and Coke" published in the 1978 Annual Book of ASTM Standards, Part 26.

The discharge temperature of the dried coal from dryer 20 is readily controlled by varying the temperature of the hot gas and the residence time in dryer 20. Temperatures beneath grate 22 should be controlled to avoid initiating spontaneous combustion of the coal on grate 22. Suitable temperatures for many coals are from about 250° to about 950° F. (104° to 570° C.).

In the operation of cooler 40 the temperature of the dried coal charged to cooler 40 in the process shown in the FIGURE is typically that of the dried coal discharged from dryer 20 less process heat losses. The temperature of the dried coal is desirably reduced in cooler 40 to a temperature below about 100° F. (38° C.) and preferably below about 80° F. (27° C.). The cool gas is passed upwardly through the coal on grate 42 at a suitable rate to maintain the coal in a fluidized or semifluidized condition above grate 42. The residence time, the amount of cooling air and the like may be readily determined by those skilled in the art. Such determinations are dependent upon the amount of cooling required and the like. As well known to those skilled in the art, after drying lower rank coals are very susceptible to spontaneous ignition and combustion upon storage, during transportation and the like.

In many instances, it has been found that cooling such dried coals to a temperature below about 100° F. (38° C.) and preferably below about 80° F. (27°) is sufficient to inhibit spontaneous ignition of the dried coal. Not all dried low rank coals will be found to be sufficiently nonreactive to permit storage and transportation without further treatment after cooling although in many instances such dried low rank coals will be sufficiently nonreactive after cooling that spontaneous ignition is avoided. It has been observed that spontaneous ignition of such dried low rank coal is inhibited by the use of a suitable deactivating fluid to further reduce the tendency of the dried coal to spontaneously ignite as discussed more fully hereinafter. The deactivating fluid is desirably applied by intimately mixing it with the dried coal to produce a dried coal product having a reduced tendency toward spontaneous combustion. The use of deactivating fluid also reduces dusting tendencies of the dried coal.

Some suitable deactivating fluids are disclosed in U.S. Pat. No. 4,402,707 entitled "Deactivating Dried Coal With A Special Oil Composition" issued Sept. 6, 1983 to Donald K. Wunderlich. The virgin vacuum reduced crude disclosed is mixed with the dried coal in quantities of about one-half to two gallons of oil per ton of dried coal and preferably from about one to about one and one-half gallons is used. Such materials have been found to inhibit the reactivity of the dried coal with respect to spontaneous ignition to a high degree. Such processes are considered to be known to those skilled in the art and several process variations and modifications are shown in the patents previously incorporated by reference. Such variations and modifications may be found effective in the practice of the present invention.

While such coal drying processes are effective to produce a dried coal fuel which is sufficiently nonsusceptible to spontaneous ignition that it can be transported and stored safely, the processes do produce a large amount of finely divided coal. Such finely divided coal is difficult to transport and in most instances is not produced as a transportable fuel. As a result, a large portion of the coal may be discarded, used as landfill and the like. Clearly the waste of the finely divided coal in this manner is undesirable. Similarly, the use of such processes requires the construction of combustion equipment and exhaust gas treatment equipment at facilities which are frequently remotely located where such equipment is not normally required. The operation of such equipment can constitute a significant operating expense for such coal drying processes.

A variety of different types of coal fired furnaces and electric power generating facilities can be used in conjunction with the present invention. A representative power generating system is shown in a paper entitled "Design Considerations For Large Utility Steam Generators" presented by Combustion Engineering Inc., 1000 Prospect Hill Road, Windsor, Conn., at a symposium on "Boiler Technology: A New Prospective," in New Delhi, India, Feb. 3-5, 1975.

In the FIGURE a schematic diagram of a tangentially fired, dry bottom type furnace 60 is shown. In the FIGURE, coal fuel is fed via a line 56 to a coal pulverizer 66 where it is pulverized in an apparatus such as a ball mill prior to charging it to furnace 60 via a line 58. The air used to entrain the finely divided coal produced in pulverizer 66 and supply a portion of the oxygen for combustion is supplied through a line 68 and is generally referred to as primary air to the furnace. Additional air, generally referred to as secondary air, is charged to furnace 60 via lines 64 and 64'. The coal fuel is introduced into and burned in furnace 60 as known to those skilled in the art. The combustion of the coal produces a hot combustion gas stream. In a radiant zone 62 the flames impinge directly upon or are in close association with a plurality of heat exchanger tubes 86 which are generally positioned to extend upwardly through radiant zone 62 and generally around the outer perimeter of radiant zone 62 to produce steam from water charged to tubes 86 via a line 120. The steam from tubes 86 is recovered via a drum 92 and passed via a line 94 to a series of heat exchanger tubes 96 in a convection section 72. The steam is generally heated to a temperature of about 1000° F. (537° C.) at a pressure of about 2000 psi in tubes 96 and then passed through a line 100 to drive a first turbine 102. The spent steam from turbine 102, is passed through a line 104 back to a second set of heat exchange tubes 106 in convection section 72 where it is reheated to a temperature of about 500° F. (260° C.) and a pressure of about 600 psi. The steam is then passed through a line 108 to drive a second turbine 110. Turbines 102 and 110 may be positioned as shown on a common shaft 109 to drive an electrical generator 111 to produce electricity. The spent steam is recovered from second turbine 110 at about 212° F. (100° C.) at a slight negative pressure through a line 112 and passed to a condenser 114. In condenser 114 the steam is condensed to water which is passed via a line 116 to an economizer section 74 where it is passed through heat exchanger tubes 118 to preheat the water for recycle to furnace 60 via line 120. A blowdown stream is recovered from line 116 via a line 116a as required to adjust the solids, hardness content of the water, and the like. Make-up water may be added to line 120 via a make-up water line 84.

The water is treated as those known to those skilled in the art for use in a boiler so that scaling of the tubes and the like is avoided. The hot gases produced in furnace 60 generally pass upwardly through radiant zone 62 at temperatures from about 3000° to about 2000° F. (1650° to 1090° C.) with the temperature decreasing as the hot gases rise through the furnace. The temperature at the nose 70 of furnace 60 is typically from about 1800° to about 2000° F. (980° to 1090° C.). As known to those skilled in the art, the temperatures at the nose are generally such that no sticky ash remains in the gas at the entrance to convection section 72. The heat exchange surfaces in the furnace are designed as known to those skilled in the art to avoid the accumulation of coal ash deposits on the heat exchange surfaces. Generally in convection zone 72 the gases are reduced in temperature from about 1800° to about 2000° F. (980° to 1090° C.) to approximately 1000° F. (537° C.). The gases then flow into economizer section 74 where they are further cooled to a temperature from about 600 to about 800° F. (325° to 425°) by heat exchange with the water which is being heated in tubes 118 for use as feed water to furnace 60. The gases then flow to an air heating section 76 where the temperature is reduced to about 250° to about 350° F. (122° to 177° C.) by heat exchange with the primary air from a line 130 in a heat exchanger 132 and with secondary air from a line 126 in a heat exchanger 128.

The exhaust gases from air heating section 76 are generally at a temperature of about 250° to about 350° F. (122° to 177° C.) and are passed via a line 78 to an exhaust gas treatment section 80 where the exhaust gas is treated for removal of acidic components, entrained solids and the like, as required for discharge to the atmosphere via a line 82.

The operation of such electric power generating furnaces is well known to those skilled in the art and will not be further discussed in detail.

By the process of the present invention, a synergistic improvement is accomplished by actively coupling the coal drying process and furnace 60. Heated gas for use in the coal drying process is desirably withdrawn from either convection section 72 or economizer section 74 and preferably from economizer section 74 at a temperature suitable for use in drying the low rank coal. The combustion gas is well adapted to this purpose since it is typically low in oxygen, i.e., less than about three percent oxygen, relatively low in humidity and available in substantial quantities at a suitable temperature. This gas can readily be removed from the electric power generating system since it is primarily used to heat the inlet water which can alternatively be heated by direct heat exchange with the hot gases in furnace 60. The use of this hot combustion gas in coal dryer 20 eliminates the need for separate combustion equipment to produce hot gases for coal dryer 20. The stream of exhaust gas recovered from coal dryer 20 via cyclone 30 may contain quantities of finely divided coal solids typically smaller than about 100 Tyler Mesh. This stream is conveniently passed to treatment with the stream in line 78 to recover the finely divided solids and other undesirable constituents from the stream prior to exhaust through line 82, thereby eliminating the requirement for separate exhaust gas treating equipment for the coal drying process. The use of a single exhaust gas clean-up facility significantly reduces the cost for operation of the combined coal drying and electrical power generating system by comparison to separate operation of the same facilities. Alternatively, this stream could be passed through a line 142, and line 56 into coal pulverizer 66 so that the coal fines can be consumed in furnace 60. Such may not be desirable since the gas is primarily an exhaust gas and contains little oxygen. The determination as to whether this stream should be passed to exhaust gas cleanup or to pulverizer 66 will depend upon the amount of coal fines contained in the stream and the like.

The discharged cooling gas, recovered from coal cooler 40, via cyclone 50, through line 54 is desirably passed to coal pulverizer 66 via lines 54 and 56. This stream is an air stream and will be at an elevated temperature as a result of its use to cool the hot dried coal and it will contain finely divided coal. Alternatively this stream could be charged to gas treatment facility 80 and discharged as exhaust gas. The heated gas streams taken from the electric power generating facility for use in coal dryer 20 are taken from the heated gas stream at a point beyond the area where the stream is used to heat steam to produce electricity. This lower temperature gas is well adapted to use in the coal drying process but of considerably less value in the electric power generating process for the production of high pressure steam. Thus a stream of hot combustion gases which has limited value in the electric power generating process is used to achieve coal drying.

The flow of inlet air to furnace 60 and cooler 40 can be supplied in the combined system by a single fan by contrast to the requirement for two fans when the processes are operated separately. For instance a fan in line 126 downstream of the junction of lines 44 and 130 with line 126 can meet the fan requirements for both units. Typically a supplemental fan is used to boost the pressure of the air charged to coal pulverizer 66.

Similarly a single fan can be used to move combustion gases through the heat exchange zones in furnace 60, i.e., convection zone 72, economizer section 74 and air treating section 76, to and through coal dryer 20 and to exhaust via exhaust gas cleanup section 80 by contrast to the requirement for two fans when the processes are operated separately. The fan can be positioned at a number of points in the flow system as known to those skilled in the art.

Furnace 60 has been shown as a tangentially fired dry bottom furnace, but it should be understood that other types of furnaces could be used such as but not limited to fluidized bed furnaces. The operation of such furnaces differs in detail as known to those skilled in the art, but the synergism achieved by the present invention is realized with all types of furnaces. With fluidized bed furnaces no supplemental fan is required.

As a result of the operation of the coal drying process in close conjunction with the electric power generating process, it will be noted that coal fines recovered from cyclones 30 and 50 via lines 32 and 52 can be used in furnace 60. Since this finely divided coal stream requires little if any pulverization for use as a fuel, a valuable fuel stream has been supplied in a ready to use form which previously was useful primarily only to generate combustion gas for use in the coal drying process or in many instances was considered a waste stream and was used for landfill. Thus a stream ideally suited for use as a fuel in an electric power generating process has been supplied with no resulting loss in the quality of desired dried coal fuel product which is recovered from the coal drying process through line 48. Clearly a portion of the dried coal product can be passed through a line 50 and line 56 to pulverizer 66 for use as fuel for furnace 60. Production of the dried coal fuel in a combined operation provides handling efficiency and assures a reliable source of uniform quality fuel for furnace 60. It will also be noted that in the practice of the present invention there is little reason to recycle exhaust gas from coal dryer 20 via line 34 since the use of such recycled gas is necessary only to control the temperature of the drying gas and, by the process of the present invention, the temperature can be controlled by selection of the point at which the gases are removed from the electric power generating process. Such a recycle stream could be used if necessary for fine temperature control but its use should be minimized since it is a relatively high humidity stream. Clearly the operation of the present process to produce dried coal fuel can be varied over a wide range to increase the amount of dried coal fuel product produced or to increase the amount the dried coal product fed to furnace 60. Similarly, wide variation is possible in the degree of drying accomplished. In other words, it may be desirable in some instances to dry the low rank coal to a relatively low moisture content whereas in others it may not be desirable to reduce the water content so significantly. There may be instances when it is not necessary to dry a low rank coal initially containing 30 weight percent water to a water content as low as for example 10 percent. Such variations will depend primarily upon the uses to be made of the dried coal fuel. If the dried coal fuel is dried primarily to increase the BTU content per pound then drying may not be necessary to the degree desired if the drying is being performed to reduce the weight of the dried coal fuel for transportation or the like. Such variations are known to those skilled in the art and need not be discussed further. Similarly the operation of electrical power generating facilities is well known to those skilled in the art and does not need to be discussed in detail.

The electric power generating process benefits from the combination of the two processes by receiving a portion of the coal fuel as finely divided coal and by receiving a dried coal fuel at a consistent degree of drying. The BTU content of the dried coal can be varied by varying the amount of drying as desired for feed to the furnace. The furnace can thus be supplied with a dried low rank coal fuel without the need to grind all of the coal fuel and with a coal fuel with a BTU content which is optimal for the furnace.

As discussed previously the combined process requires only two fans by contrast to the four required for separate operations.

As discussed above the active combination of the coal drying process and the electric power generating process as set forth has improved the efficiency of both processes in a synergistic fashion as follows.

1) Fewer fans are required for the combined operation.

2) A single exhaust gas treatment plant can be used.

3) A consistent and reliable dried coal fuel supply is provided for furnace 60.

4) Combustion gas at a temperature suitable for drying the low rank coal is available without separate combustion facilities and without significant detriment to the electric power generating process.

Having thus described the present invention by reference to certain of its preferred embodiments, it is respectfully pointed out that the embodiments discussed are illustrative rather than limiting in nature, and that many variations and modifications are possible within the scope of the present invention. Many such variations and modifications may be considered obvious and desirable by those skilled in the art based upon a review of the foregoing description of preferred embodiments.

Having thus described the invention I claim:

1. A method for producing dried particulate coal fuel and electricity from a low rank particulate coal, said method consisting essentially of:

(a) charging said particulate low rank coal to a coal drying zone wherein said coal is supported on a first support means, said first support means being adapted to the flow of a hot gas upwardly through said support means and said particulate low rank coal;

(b) drying said particulate low rank coal in said coal drying zone by flowing a hot combustion gas upwardly through said first support means and said particulate low rank coal to heat said particulate low rank coal to a temperature from about 130° to about 250° F. and produce said dried particulate coal fuel;

(c) charging a portion of such dried particulate coal to a coal fired furnace for combustion to produce a hot combustion gas stream at a temperature above above 2000° F.;

(d) charging at least a major portion of said hot combustion gas to a heat exchange zone wherein said hot combustion gas is cooled to a temperature from about 250° to about 950° F. to produce steam, heated water or heated air;

(e) charging at least a portion of said steam to an electrical generator to produce said electricity; and (f) charging a portion of said hot combustion gas at a temperature from about 250° to about 950° F. to said coal drying zone as said hot gas.

2. The method of claim 1 wherein said portion of said dried particulate coal charged to said coal burning unit comprises finely divided dried particulate coal.

3. The method of claim 2 wherein said finely divided particulate coal is smaller than about 80 Tyler mesh.

4. The method of claim 1 wherein low rank particulate coal is selected from the group consisting of sub-bituminous, lignite and brown coals.

5. The method of claim 1 wherein said low rank particulate coal has a water content from about 25 to about 65 weight percent water.

6. The method of claim 1 wherein at least a portion of said dried particulate coal fuel is cooled to a temperature below about 100° F.

7. The method of claim 6 wherein a portion of said dried particulate coal fuel is mixed with a virgin vacuum reduced crude.

8. The method of claim 1 wherein said portion of said hot combustion gas is taken from the economizer heating portion of said heat exchange zone.

9. The method of claim 8 wherein said hot combustion gas is at a temperature from about 600° to about 800° F.

10. The method of claim 1 wherein a single exhaust gas treatment facility is used to treat said combustion gas discharged from said coal drying zone and said coal fired furnace.

11. The method of claim 1 wherein a single fan is used for the flow of said combustion gas.

12. The method of claim 1 wherein a single fan is used for the flow of air charged to said furnace and said cooler and wherein said furnace is a tangentially fired, dry bottom furnace.

13. The method of claim 12 wherein a supplementary fan is used for the flow of primary air to said furnace.

14. The method of claim 1 wherein a portion of the boiler combustion air is pre-heated by use of said portion of the boiler combustion air to cool said dried particulate coal fuel.

* * * * *